(12) United States Patent
Takada

(10) Patent No.: US 12,744,463 B2
(45) Date of Patent: Sep. 22, 2026

(54) SWITCHING REGULATOR

(71) Applicant: ABLIC Inc., Nagano (JP)

(72) Inventor: Kosuke Takada, Nagano (JP)

(73) Assignee: ABLIC Inc., Nagano (JP)

( * ) Notice: Subject to any disclaimer, the term of this patent is extended or adjusted under 35 U.S.C. 154(b) by 111 days.

(21) Appl. No.: 19/026,568

(22) Filed: Jan. 17, 2025

(65) Prior Publication Data

US 2025/0260322 A1 Aug. 14, 2025

(30) Foreign Application Priority Data

Feb. 13, 2024 (JP) ................................ 2024-019227

(51) Int. Cl.
*H02M 3/158* (2006.01)
*G05F 1/575* (2006.01)
*H02M 3/156* (2006.01)
*H02M 3/157* (2006.01)

(52) U.S. Cl.
CPC ............ *H02M 3/158* (2013.01); *G05F 1/575* (2013.01); *H02M 3/156* (2013.01); *H02M 3/157* (2013.01); *H02M 3/1588* (2013.01)

(58) Field of Classification Search
CPC ...................... H02M 3/156–158; G05F 1/575
See application file for complete search history.

(56) References Cited

U.S. PATENT DOCUMENTS

2009/0128116 A1* 5/2009 Noda .................. H02M 3/1588 323/290
2010/0066333 A1* 3/2010 Noda .................. H02M 3/156 323/282
2010/0181977 A1* 7/2010 Sohma ................. H02M 3/156 323/282
2011/0043175 A1* 2/2011 Sohma ................. H02M 3/156 323/282

FOREIGN PATENT DOCUMENTS

JP 2020202714 12/2020

* cited by examiner

*Primary Examiner* — Gary A Nash
(74) *Attorney, Agent, or Firm* — JCIPRNET

(57) ABSTRACT

A switching regulator includes a first differential amplifier outputting an amplified difference voltage obtained by amplifying a difference between a reference voltage and a feedback voltage in proportion to an output voltage; a second differential amplifier including a differential pair of a first transistor and a second transistor, the second differential amplifier outputting an error voltage based upon the amplified difference voltage supplied to each gate of the first transistor and the second transistor; a pulse wide modulation circuit converting the error voltage into a PWM signal; a first resistor containing a first end connected to the source of the first transistor; a second resistor containing a first end connected to the source of the second transistor; and a capacitor containing a first end connected to the source of the first transistor and the first end of the first resistor.

4 Claims, 4 Drawing Sheets

SWITCHING REGULATOR

CROSS-REFERENCE TO RELATED APPLICATION

This application claims the priority benefit of Japan application serial no. 2024-019227, filed on Feb. 13, 2024. The entirety of the above-mentioned patent application is hereby incorporated by reference herein and made a part of this specification.

BACKGROUND

Technical Field

The present invention relates to a switching regulator.

Description of Related Art

In general, the switching regulator is configured to generate a constant voltage as an output voltage in response to apply a power voltage. A preferable switching regulator is controlled to maintain the output voltage at a constant value even if a load current suddenly fluctuates. Conventional switching regulator includes a comparator and/or a counter to speed up a response of the output voltage with respect to sudden fluctuations of a load current (e.g., refer to Japanese Patent Application Laid-Open No. 2020-202714).

However, the conventional switching regulator consumes large current because of including the comparator and/or the counter of which a consumption current is larger than that of other than the comparator and/or the counter.

SUMMARY

Considering the large current is consumed in the conventional switching regulator, an objective of the present invention is to provide a switching regulator decreasing the consumption current in comparison with that of the conventional switching regulator, the switching regulator also having a high-speed responsiveness of the output voltage with respect to sudden fluctuations of the load current.

A switching regulator according to aspects of the present invention includes: a first differential amplifier outputting an amplified difference voltage obtained by amplifying a difference between a reference voltage and a feedback voltage in proportion to an output voltage; a second differential amplifier including a differential pair of a first transistor and a second transistor, outputting an error voltage based upon the amplified difference voltage supplied to each gate of the first transistor and the second transistor; a pulse wide modulation circuit converting the error voltage into a PWM signal; a first resistor containing a first end connected to the source of the first transistor, and a second end; a second resistor containing a first end connected to the source of the second transistor, and a second end; and a capacitor containing a first end connected to the source of the first transistor and the first end of the first resistor.

According to the switching regulator, the switching regulator can decrease the consumption current in comparison with that of the conventional switching regulator, and also has the high-speed responsiveness of the output voltage with respect to sudden fluctuations of the load current.

DESCRIPTION OF THE EMBODIMENTS

A switching regulator of embodiments according to the present invention will be described with reference to the drawings.

First Embodiment

Figure 1:
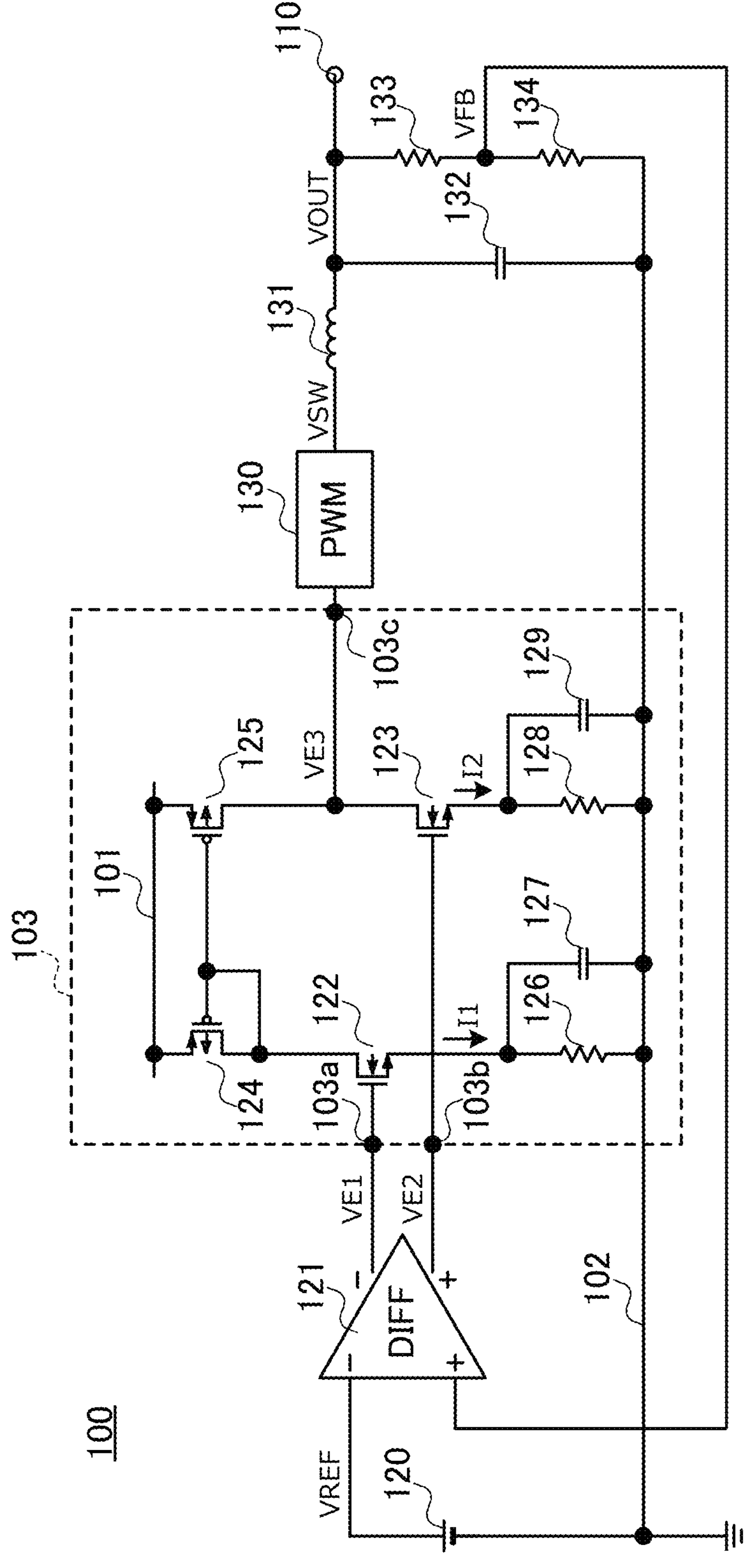
FIG. 1 is a circuit diagram illustrating a first configuration example of a switching regulator according to a first embodiment of the present invention.

FIG. 1 is a circuit diagram illustrating a switching regulator 100 serving as a first configuration example of a switching regulator according to a first embodiment of the present invention.

The switching regulator 100 includes a power supply terminal 101, a ground terminal 102, a reference voltage source 120, a first differential amplifier 121, NMOS transistors 122 and 123, PMOS transistors 124 and 125, resistors 126 and 128, capacitors 127 and 129, a PWM conversion circuit 130, an inductor 131, a capacitor 132, resistors 133 and 134, and an output terminal 110. The NMOS transistors 122 and 123, PMOS transistors 124 and 125, resistors 126 and 128, and capacitors 127 and 129 constitute a second differential amplifier 103.

The first differential amplifier 121 includes an inverting input terminal (−) and a non-inverting input terminal (+), and a first output terminal (−) and a second output terminal (+). The second differential amplifier 103 has a differential pair including NMOS transistors 122 and 123, a current mirror circuit including PMOS transistors 124 and 125, a resistor 126 and a capacitor 127 constituting a phase lead circuit, and a resistor 128 and a capacitor 129.

The resistor 126 contains a first end connected to the source of the NMOS transistor 122 and a second end connected to the ground terminal 102. The capacitor 127 contains a first end connected to the first end of the resistor 126 and a second end connected to the second end of the resistor 126. In other words, the capacitor 127 is connected in parallel with the resistor 126. The resistor 128 contains a first end connected to the source of the NMOS transistor 123 and a second end connected to the ground terminal 102. The capacitor 129 contains a first end connected to the first end of the resistor 128 and a second end connected to the second end of the resistor 128. In other words, the capacitor 129 is connected in parallel with the resistor 128.

Further, the second differential amplifier 103 includes input terminals **103*a* and 103*b*, and an output terminal 103*c*. Here, the input terminals 103*a* and 103*b* are nodes that receive signals supplied from the first differential amplifier 121. To describe specifically, the input terminal 103*a* is the connection point of the first output terminal (−) of the first differential amplifier 121 and the gate of the NMOS transistor 122. The input terminal 103*b* is the connection point of the second output terminal (+) of the first differential amplifier 121 and the gate of the NMOS transistor 123. The output terminal 103*c* is the connection point of the drain of the PMOS transistor 125 and the drain of the NMOS transistor 123, and is a node that outputs a signal to the input terminal of the PWM conversion circuit 130**.

The reference voltage source 120 includes a first terminal connected to the inverting input terminal (−) of the first differential amplifier 121 and a second terminal connected to the ground terminal 102.

The first differential amplifier 121 includes the non-inverting input terminal (+) connected to a connection point between the resistor 133 and the resistor 134, the first output terminal (−) connected to the gate of the NMOS transistor 122, and the second output terminal (+) connected to the gate of the NMOS transistor 123.

The NMOS transistor 122 includes the source connected to the first end of the resistor 126 and the first end of the capacitor 127, and the drain connected to the gate and drain of the PMOS transistor 124 and the gate of the PMOS transistor 125. The NMOS transistor 123 includes the source connected to the first end of the resistor 128 and the first end of the capacitor 129, and the drain connected to the drain of the PMOS transistor 125 and the input terminal of the PWM conversion circuit 130.

The power supply terminal 101 is connected to the source of the PMOS transistor 124 and the source of the PMOS transistor 125. The inductor 131 contains a first end connected to the output terminal of the PWM conversion circuit 130, and a second end connected to the output terminal 110 of the switching regulator 100, a first end of the capacitor 132, and a second end of the resistor 133. A second end of the resistor 134 and a second end of the capacitor 132 are connected to the ground terminal 102. The inductor 131 and the capacitor 132 constitute a smoothing circuit.

Next, the operation of the switching regulator 100 is described. The power supply terminal 101 supplies a predetermined power voltage. The ground terminal 102 provides a power voltage different from that of the power supply terminal 101, and as an example of a reference power voltage for circuit operation, it supplies a power voltage of OV (zero volt) (hereinafter referred to as "ground voltage").

The voltage at the output terminal 110 corresponds to the output voltage VOUT of the switching regulator 100. The resistors 133 and 134 divide the output voltage VOUT to generate a feedback voltage VFB. The first differential amplifier 121 amplifies the difference between the reference voltage VREF output from the reference voltage source 120 and the feedback voltage VFB, and outputs voltages VE1 and VE2 as differential outputs from the first output terminal (−) and the second output terminal (+), respectively. The differentially output voltages VE1 and VE2 are supplied to the second differential amplifier 103 (more specifically, voltage VE1 to the gate of the NMOS transistor 122 and voltage VE2 to the gate of the NMOS transistor 123).

In the second differential amplifier 103, the differential pair including the NMOS transistors 122 and 123 converts the voltages VE1 and VE2, which are the output voltages of the first differential amplifier 121, into currents I1 and I2, respectively. Further, in the second differential amplifier 103, a zero is generated by the NMOS transistors 122 and 123, resistors 126 and 128, and capacitors 127 and 129. This is because as the frequency increases, the impedance of the capacitors 127 and 129 decreases, causing the currents I1 and I2 to increase. The currents I1 and 12 are received by the current mirror circuit composed of the PMOS transistors 124 and 125. The error voltage VE3 generated at the drain of the PMOS transistor 125 is supplied to the PWM conversion circuit 130.

The PWM conversion circuit 130 converts the received error voltage VE3 into a PWM signal and supplies a pulse voltage VSW to the inductor 131. The inductor 131 and the capacitor 132 smooth the received pulse voltage VSW and generate the output voltage VOUT at the output terminal 110.

According to the switching regulator 100, the switching regulator 100 includes a phase lead circuit without including a comparator or a counter, and therefore can generate a zero in the second differential amplifier 103, thereby increasing the gain at high frequencies. Thus, the response to variations in the output voltage VOUT in response to sudden fluctuations in the load current can be high-speed, while decreasing the consumption current compared to conventional designs.

Second Embodiment

Figure 2:
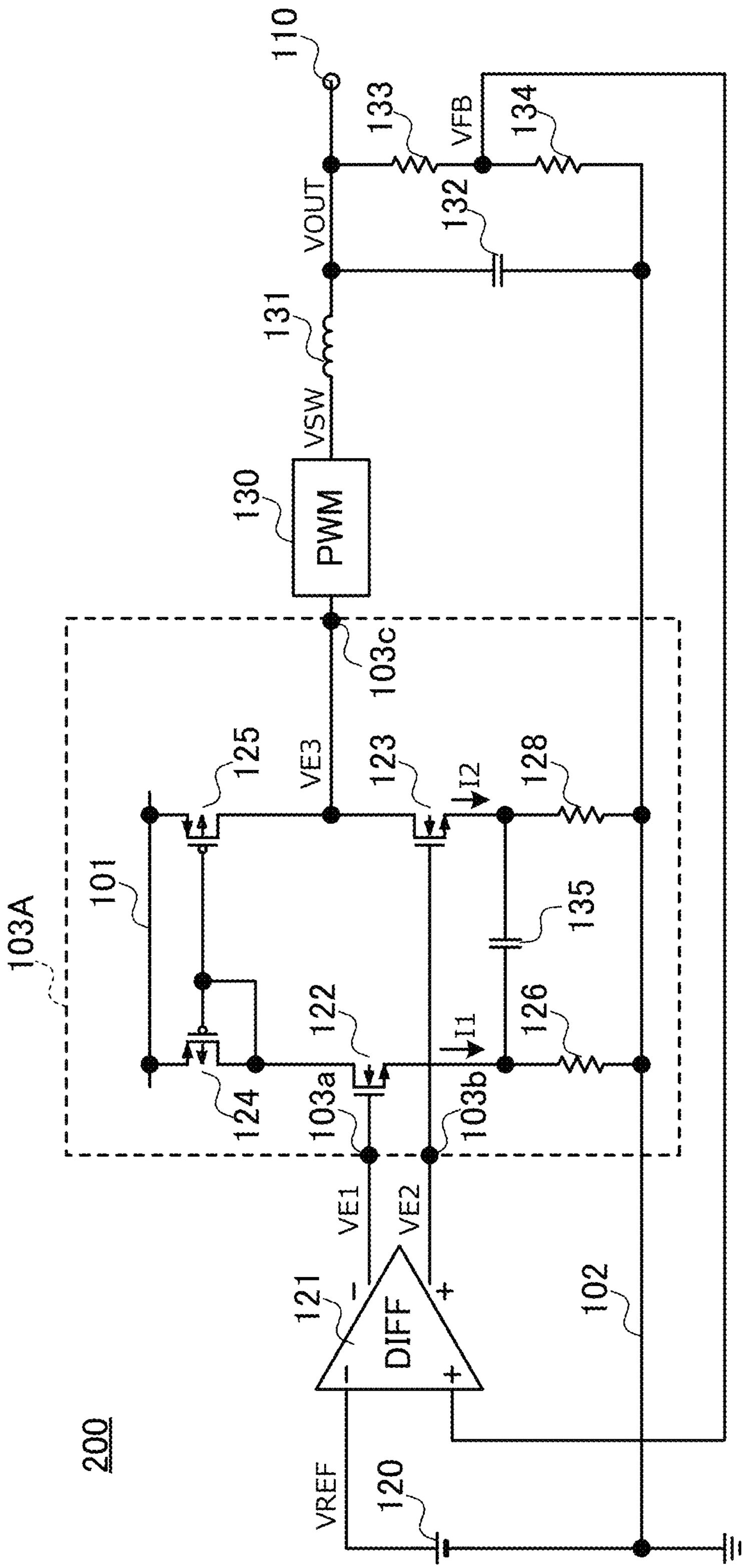
FIG. 2 is a circuit diagram illustrating a configuration example of a switching regulator circuit according to a second embodiment of the present invention.

FIG. 2 is a circuit diagram illustrating a switching regulator 200 serving as a configuration example of a switching regulator according to a second embodiment of the present invention.

The switching regulator 200 is different from the switching regulator 100 in that a capacitor 135 is further included, and the capacitors 127 and 129 are omitted, but there is no substantial difference in other respects. That is, the switching regulator 200 includes a second differential amplifier 103A instead of the second differential amplifier 103. Thus, in the description of the present embodiment, different points from the switching regulator 100 will be mainly described, and other components which are substantially the same will be denoted by the same reference numerals, and redundant description will be omitted.

The switching regulator 200 includes the power supply terminal 101, the ground terminal 102, a second differential amplifier 103A including the reference voltage source 120, the first differential amplifier 121, the NMOS transistors 122 and 123, the PMOS transistors 124 and 125, the resistors 126 and 128, and a capacitor 135, the PWM conversion circuit 130, the inductor 131, the capacitor 132, the resistors 133 and 134, and the output terminal 110. In the switching regulator 200, the resistors 126 and 128, and the capacitor 135 constitute the phase lead circuit. That is, the switching regulator 200 includes the phase lead circuit including the resistors 126 and 128, and the capacitor 135. The capacitor 135 containing a first end connected to the source of the NMOS transistor 122 and the first end of the resistor 126, and a second end connected to the source of the NMOS transistor 123 and the first end of the resistor 128.

Next, the operation of the switching regulator 200 is described.

The capacitor 135 decreases in impedance as the frequency increases, allowing currents I1 and I2 to flow, and can generate a zero similar to the switching regulator 100. Since I1 and I2 are differential currents, the capacitance value of the capacitor 135 may be half of the capacitance values of the capacitors 127 and 129 in the phase lead circuit of the switching regulator 100.

According to the switching regulator 200, similar to the switching regulator 100, a zero can be added to the second differential amplifier 103A and the gain can be increased at high frequencies without including a comparator or a counter. Thus, effects similar to those of the switching regulator 100 can be obtained. In other words, according to the switching regulator 200, the response to changes in the output voltage VOUT can be high-speed in response to sudden fluctuations in the load current, while decreasing the consumption current compared to conventional designs. Furthermore, according to the switching regulator 200, the capacitance value of the capacitor 135 constituting the phase lead circuit can be reduced to half of the capacitance values of the capacitors 127 and 129 in the switching regulator 100.

The present invention is not limited to the above-described embodiments as they are, and in the implementation stage, it is possible to implement it in various forms other than the above-described embodiments, and various omissions, additions, replacements, or modifications can be made without departing from the scope of the present invention. For example, the phase lead circuit included in the switching regulator of the embodiments according to the present invention is not limited to the configurations illustrated in FIGS. 1 and 2.

Figure 3:
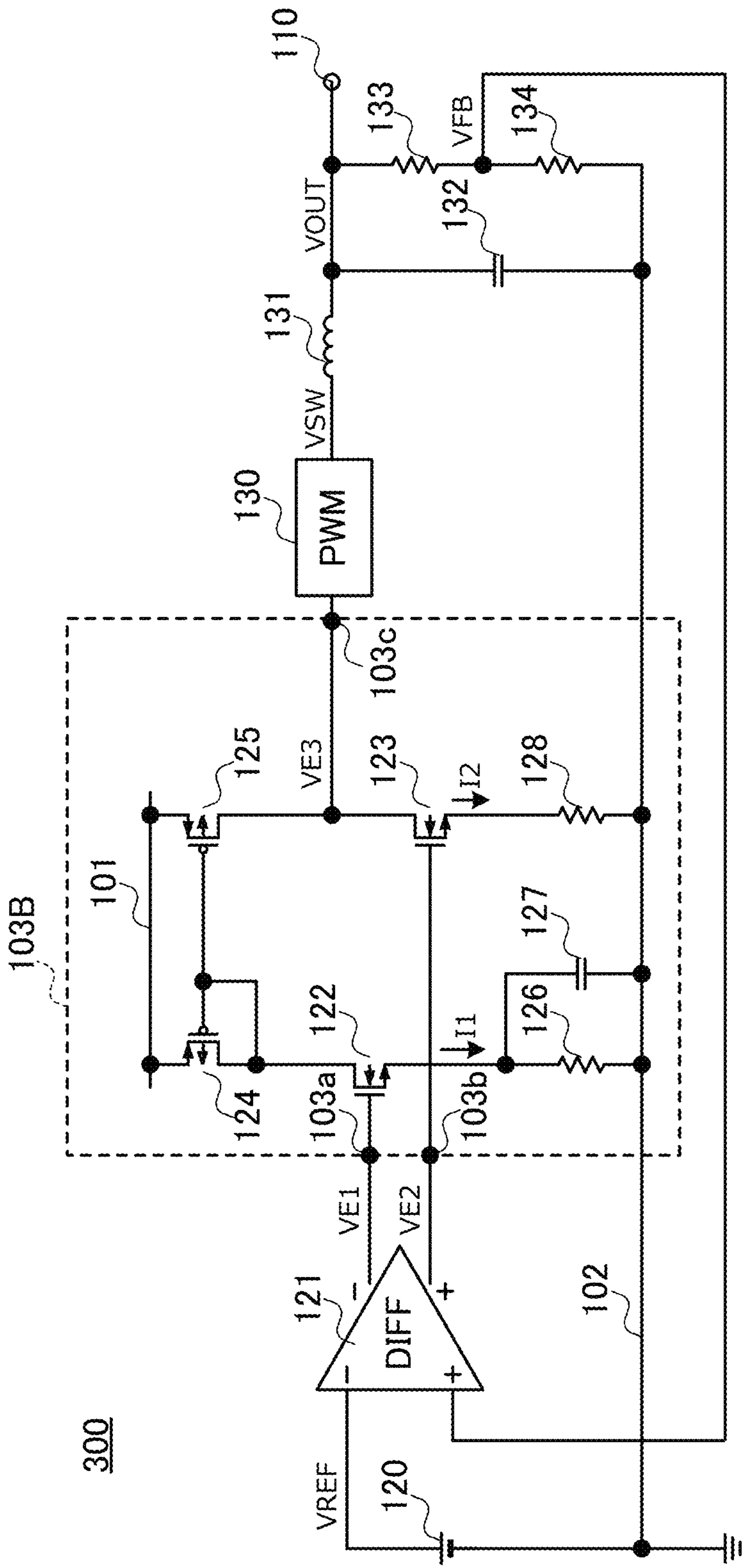
FIG. 3 is a circuit diagram illustrating a first variation (second configuration example) of the switching regulator according to the first embodiment of the present invention.
Figure 4:
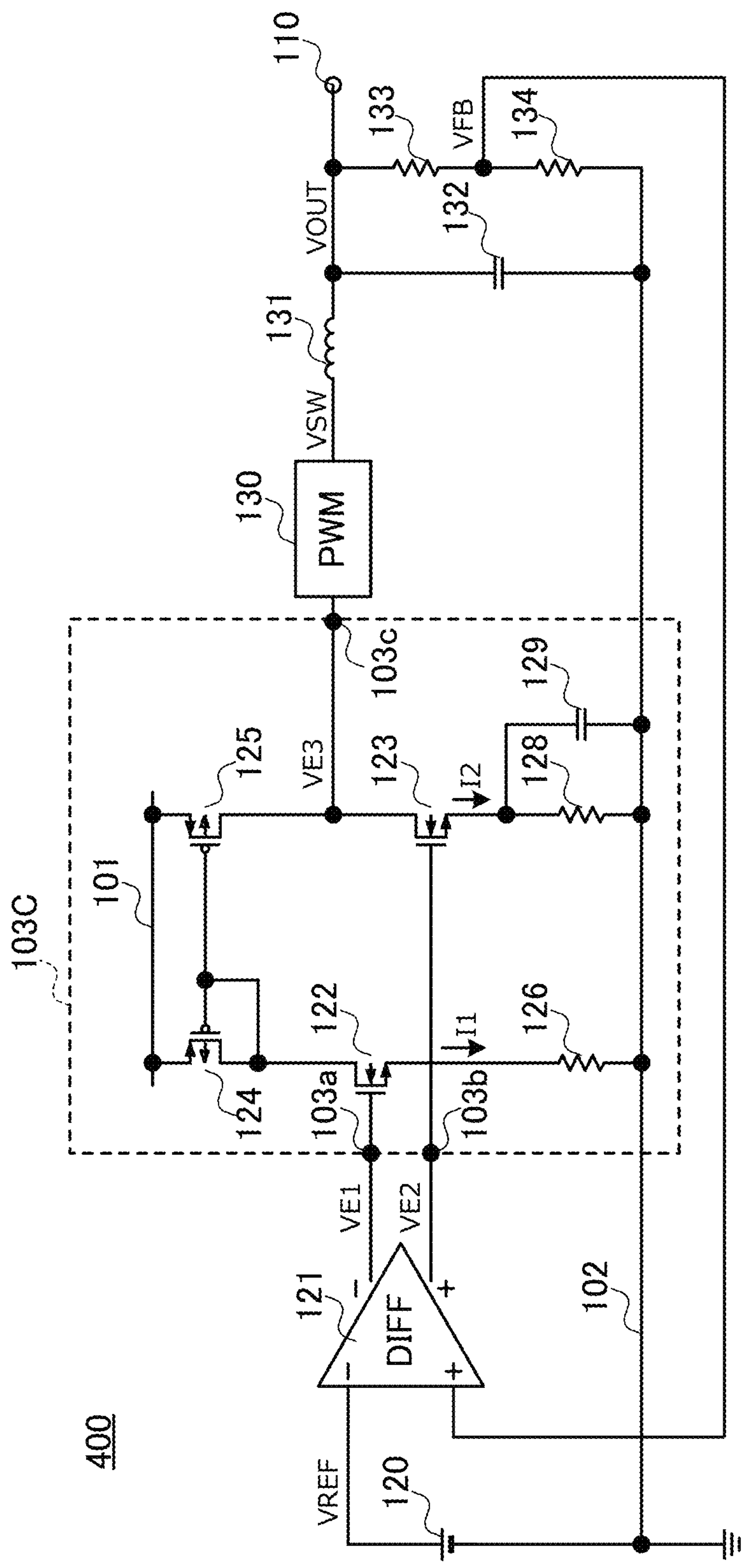
FIG. 4 is a circuit diagram illustrating a second variation (third configuration example) of the switching regulator according to the first embodiment of the present invention.

FIG. 3 is a circuit diagram illustrating a switching regulator 300, and FIG. 4 is a circuit diagram illustrating a switching regulator 400. The switching regulators 300 is a first variation of the first embodiment according to the present invention, the first variation corresponding to a second configuration example of the first embodiment. The switching regulator 300 is different from the switching regulator 100 in that a second differential amplifier 103B in the switching regulator 300 is included instead of the second differential amplifier 103. The switching regulators 400 is a second variation of the first embodiment according to the present invention, the second variation corresponding to a third configuration example of the first embodiment. The switching regulator 400 is different from the switching regulator 100 in that a second differential amplifier 103C in the switching regulator 400 is included instead of the second differential amplifier 103.

The phase lead circuit includes at least one capacitor containing a first end which is connected to the first end of the resistor 126 or 128 connected to the source of the NMOS transistor 122 or 123. More detail, as illustrated in FIGS. 2 to 4, the phase lead circuit may include one capacitor such as the capacitor 135 (refer to FIG. 2), the capacitor 127 (refer to FIG. 3), or the capacitor 129 (refer to FIG. 4). Further, the phase lead circuit may include two capacitors such as the capacitors 127 and 135, or the capacitors 129 and 135, or three capacitors such as the capacitors 127, 129 and 135.

The switching regulator of the aspects according to the present invention is not limited to the switching regulator generating the feedback voltage VFB by dividing the output voltage VOUT. The output voltage VOUT may be utilized as the feedback voltage VFB. That is, the feedback voltage VFB can be set as any positive voltage which is less or equal to the output voltage VOUT. When a real number k which is larger than zero, and is less or equal to one, i.e., $0<k\leq 1$, the feedback voltage VFB can be represented as a product of the real number k and the output voltage VOUT.

According to aspects of the present invention as described above, the consumption current in comparison with that of the conventional switching regulator can be decreased. Further, the high-speed responsiveness of the output voltage with respect to sudden fluctuations of the load current can be obtained.

These embodiments and modifications thereof are included in the scope and spirit of the invention, and are included within the scope of the invention described in the claims and equivalents thereof.

What is claimed is:

1. A switching regulator, comprising:

a first differential amplifier outputting an amplified difference voltage obtained by amplifying a difference between a reference voltage and a feedback voltage in proportion to an output voltage;

a second differential amplifier including a differential pair of a first transistor and a second transistor, the second differential amplifier outputting an error voltage based upon the amplified difference voltage supplied to each gate of the first transistor and the second transistor;

a pulse wide modulation circuit converting the error voltage into a PWM signal;

a first resistor containing a first end connected to the source of the first transistor, and a second end;

a second resistor containing a first end connected to the source of the second transistor, and a second end; and a first capacitor containing a first end connected to the source of the first transistor and the first end of the first resistor.

2. The switching regulator according to claim 1, wherein the first capacitor contains a second end connected to the second end of the first resistor.

3. The switching regulator according to claim 2, further comprising a second capacitor connected in parallel to the second resistor.

4. The switching regulator according to claim 1, wherein the first capacitor contains a second end connected to the second end of the second resistor.

* * * * *